United States Patent [19]

Kondo

[11] Patent Number: 5,174,129
[45] Date of Patent: Dec. 29, 1992

[54] ABSORPTION HEAT PUMP

[75] Inventor: Masayuki Kondo, Hamamatsu, Japan

[73] Assignee: Yazaki Corporation, Tokyo, Japan

[21] Appl. No.: 735,956

[22] Filed: Jul. 25, 1991

[30] Foreign Application Priority Data

Jul. 25, 1990 [JP] Japan .................. 2-197010

[51] Int. Cl.⁵ .............................................. F25B 1/00
[52] U.S. Cl. ...................................... 62/476; 62/324.2
[58] Field of Search .............. 62/476, 324.2, 324.1, 62/238.3, 101

[56] References Cited

U.S. PATENT DOCUMENTS

| | | | |
|---|---|---|---|
| 3,390,544 | 7/1968 | Eberz ............................ | 62/476 |
| 4,127,010 | 11/1978 | Phillips .......................... | 62/101 |
| 4,368,624 | 1/1983 | Takeshita ....................... | 62/238.3 |
| 4,742,687 | 5/1988 | Reid et al. ..................... | 62/476 X |
| 4,921,515 | 5/1990 | Dao ................................ | 62/335 |
| 4,972,679 | 11/1990 | Petty et al. .................... | 62/238.3 |

*Primary Examiner*—Albert J. Makay
*Assistant Examiner*—William C. Doerrler
*Attorney, Agent, or Firm*—Venable, Baetjer, Howard & Civiletti

[57] ABSTRACT

An absorption heat pump performs cooling and/or heating by using outside air as a radiation source and an absorption source. An absorber is inserted in a solution circulation path and a refrigerant path, absorbs refrigerant vapor in a solution, and ejects refrigerant vapor. An outside air coil for performing heat exchange between a refrigerant and the outside air and a room coil for performing heating exchange between the coolant and a heating medium from a load inside the room are disposed, and one of them functions as a condenser in cooling or heating. The condensed refrigerant from the condenser is led into the absorber so as to cool the absorber. The refrigerant vapor generated in the regenerator and the refrigerant vapor generated in the absorber which is inserted in the solution circulation path are mixed and supplied to the condenser. Therefore, it is possible to simplify components of the heat pump and to contribute toward making the heat pump compact.

6 Claims, 4 Drawing Sheets

— : COOLING
--→ : HEATING

→ : COOLING
--→ : HEATING

ABSORPTION HEAT PUMP

BACKGROUND OF THE INVENTION

1. Field of the Invention

The present invention relates to an absorption heat pump, and more particularly, to an absorption heat pump suitable for cooling and/or heating by using outside air as a radiation source and an absorption source.

2. Description of the Related Art

FIG. 4 illustrates a well-known type of absorption heat pump for cooling and heating the inside of the room by using outside air as a radiation source and an absorption source This heat pump is constituted by a regenerator 100, a four-way valve 102, outside air coils 104 and 106, a heat exchanger 108, room coils 110 and 112, three-way valves 114, 116 and 118, and a pump 120.

In the heat pump shown in FIG. 4, the outside air coil 104, the outside air coil 106 and the room coil 110 are used as a condenser, an absorber and an evaporator, respectively, in cooling, and the room coil 112 is not used. A solution flows on a course linking the regenerator 100, the three-way valve 114, the outside air coil 106, the three-way valve 118, the pump 120 and the regenerator 100, and refrigerant is generated in the regenerator 100, passes the four-way valve 102, the outside air coil 104, the heat exchanger 108, the room coil 110, the four-way valve 102, the heat exchanger 108 and the three-way valve 116, and is absorbed by the outside air coil 106.

On the other hand, in heating, the outside air coil 104, the room coil 110 and the room coil 112 are used as an evaporator, a condenser and an absorber, respectively, and the outside air coil 106 is not used. The solution passes on a course linking the regenerator 100, the three-way valve 114, the room coil 112, the three-way valve 118, the pump 120 and the regenerator 100, and the refrigerant flows on a course linking the regenerator 100, the four-way valve 102, the room coil 110, the heat exchanger 108, the outside air coil 104, the four-way coil 102, the heat exchanger 108, the three-way valve 116 and the room coil 112.

Thus, the heat pump shown in FIG. 4 uses the outside air coils 104 and 106 and the room coils 110 and 112 in different ways in cooling and heating, and can perform heating and cooling by switching the three-way valves 114, 116 and 118 and the four-way valve 102.

However, since the heat pump shown in FIG. 4 contains a heat exchanger which is unnecessary for a cooling cycle and a heat exchanger which is unnecessary for a heating cycle, the number of its components and its volume, weight and cost are large, and therefore, it is difficult to make the heat pump compact.

SUMMARY OF THE INVENTION

An object of the present invention is to provide an absorption heat pump capable of simplifying components thereof.

In order to achieve the above object, there is provided an absorption heat pump of the present invention which comprises a regenerator inserted in a solution circulation path for heating a solution and ejecting refrigerant vapor into a refrigerant path; an absorber for letting the solution absorb the refrigerant vapor in the refrigerant path in the solution circulation path, changing a refrigerant in the coolant path into vapor by heating the refrigerant by the heat of absorption, and ejecting the vapor; an outside air coil for performing heat exchange between the refrigerant and outside air; and a room coil for performing heat exchange between the refrigerant and a heating medium from a load inside the room, in which at least one of the outside coil and the room coil functions as a condenser in cooling or heating, and which further comprises means for leading the condense refrigerant from the condenser into the absorber and cooling the absorber and means for mixing the vapor ejected from the absorber and the vapor from the regenerator and supplying the mixed vapor to the condenser.

According to the above construction, since the condensed refrigerant from the condenser is led into the absorber and used to cool the absorber and the vapor generated in the absorber is mixed with the vapor from the regenerator and condensed by the condenser, it is possible to simplify the components of the heat pump.

DESCRIPTION OF THE PREFERRED EMBODIMENTS

An embodiment of the present invention will now be described with reference to the drawings.

Figure 1:
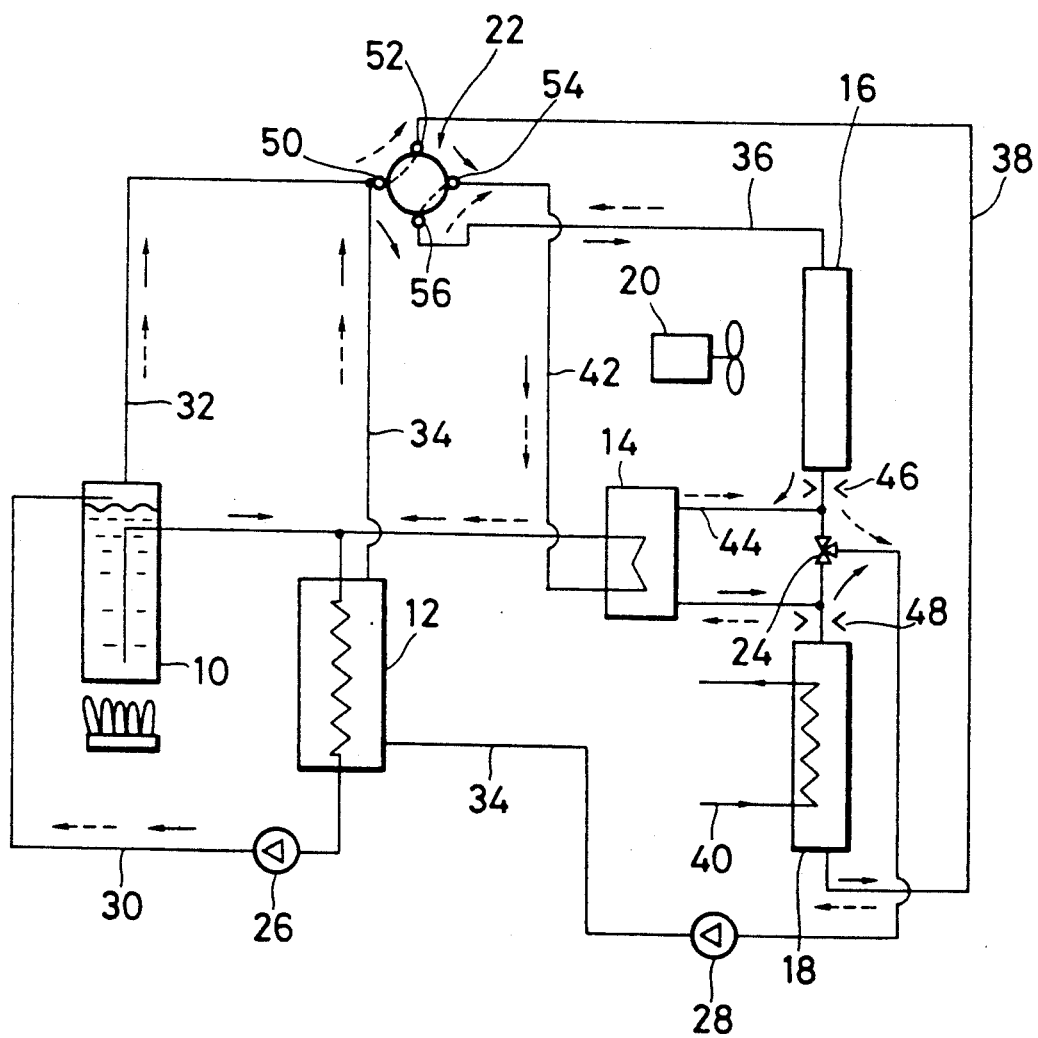
FIG. 1 is a view showing the overall configuration of an absorption heat pump using a $NH_3/H_2O$ solution according to an embodiment of the present invention.

Referring to FIG. 1, an absorption heat pump using a $NH_3/H_2O$ solution is composed of a regenerator 10, an absorber 12, a supercooler 14, an outside air coil 16, a room coil 18, a ventilator 20, a four-way valve 22, a three-way valve 24 and pumps 26 and 28.

The regenerator 10 is inserted in a pipe line of a pipe 30 that is part of a solution circulation path in which an aqueous ammonia solution circulates, heats the solution, from the pipe 30, and ejects refrigerant vapor into a pipe 32 that is a part of a refrigerant path. The absorber 12 is inserted in both the pipe line of the pipe 30 and in a pipe line of a pipe 34 that is a part of the refrigerant path. The absorber comprises an absorber coil and a vessel. In the absorber coil, a weakened solution from the regenerator (the solution is "weakened" due to the removal of refrigerant vapor that is ejected from the regenerator) is mixed with refrigerant vapor that is received from either the outside air coil 16 or the room coil 18 depending on which coil is presently functioning as an evaporator, as explained further below. The absorption of the refrigerant vapor by the weak solution produces heat of absorption, such heat being used to change a condensed refrigerant that is received in the vessel from the other of the outside air coil 16 or room coil 18, depending on which one is functioning as a condenser (as explained further below), into a refrigerant vapor. The absorber 12 ejects the refrigerant vapor through pipe 34 toward the four-way valve 22. The outside air coil 16 is inserted in a pipe line of a pipe 36 which is connected to the pipes 32 and 34 through the four-way valve 22, performs heat exchange between outside air from the ventilator 20 and the refrigerant, and thus functions as a condenser in cooling and as an evaporator in heating. On the other hand, the room coil 18 is inserted in a pipe line of another pipe 38 which is connected to the pipes 32 and 34 through the four-way valve 22, performs heat exchange between a heating medium in a pipe 40 connected inside the room for transferring the heating medium and the refrigerant condensed by the outside air coil 16 or the refrigerant vapor from the pipe 38, and thus functions as an evaporator in cooling and as a condenser in heating. The supercooler 14 is inserted in pipe lines of a pipe 42 forming a refrigerant path connected to the absorber 12 and in a pipe 44 connected to the outside air coil 16 and the room coil 18. The supercooler 14 performs heat exchange between the refrigerant in the pipe 42 and the refrigerant in the pipe 44, and ejects the heat-exchanged refrigerant into the solution in the absorber 12. Orifices 46 and 48 are formed in the pipe lines of the pipes 36 and 38, and the pipes 34, 36 and 38 are connected to the three-way valve 24, respectively. The refrigerant in the pipe 36 is supplied to the pipe 34 through the outside air coil 16, the pipe 44, the supercooler 14 and the three-way valve 24 in cooling, and the refrigerant in the pipe 38 is supplied to the pipe 34 through the room coil 18, the pipe 44, the supercooler 14 and the three-way valve 24 in heating.

On the other hand, the four-way valve 22 has a first port 50 connected to the pipes 32 and 34, a second port 52 connected to the pipe 38, a third port 54 connected to the pipe 42, and a fourth port 56 connected to the pipe 36. In cooling, the first port 50 and the fourth port 56 are connected and the second port 52 and the third port 54 are connected, and in heating, the first port 50 and the second port 52 are connected and the third port 54 and the fourth port 56 are connected.

In the above construction, when a cooling operation is performed, the valves of the four-way valve 22 and the three-way valve 24 are switched, and the actuation of the pump 26 allows the solution to circulate in the pipe 30. When, the solution in the regenerator 10 is heated, the weak solution is supplied to the absorber 12 and the refrigerant vapor is ejected from the regenerator 10. At this time, the refrigerant vapor is also ejected from the absorber 12, and these refrigerant vapors are supplied to the outside air coil 16 through the four-way valve 22 so as to be condensed. A portion of the condensed refrigerant is supplied to the pipe 34 through the orifice 46, the supercooler 14 and the three-way valve 24, and is supplied to the absorber 12 by the pump 28. The remaining condensed refrigerant is supplied to the pipe 30 through the orifice 48, the room coil 18, the four-way valve 22 and the supercooler 14. The refrigerant evaporates when passing through the room coil 18, and the evaporation cools the inside of the room.

On the other hand, when a heating operation is performed, in response to the switching of the four-way valve 22 and the three-way valve 24, the refrigerant vapors generated from the regenerator 10 and the absorber 12 flow in a route linking the four-way valve 22, the room coil 18, the supercooler 14, and the pipe 44. Part of the refrigerant ejected from the supercooler 14 is supplied to the absorber 12 through the outside air coil 16, the four-way valve 22, the supercooler 14 and the pipe 30, and a part of the refrigerant ejected from the supercooler 14 is supplied to the absorber 12 through the three-way valve 24 and the pipe 34 by the pump 28. The refrigerant is condensed when passing through the room coil 18, thereby heating the inside of the room.

Thus, in this embodiment, since the condensed refrigerant from the outside air coil 16 (condenser) is led into the absorber 12 to cool the absorber 12 and the refrigerant vapor generated from the absorber 12 is mixed with the refrigerant vapor from the regenerator 10 and condensed in the outside air coil 16, only the outside air coil 16 and the room coil 18 can perform cooling and heating of the inside of the room and the components of the heat pump can be simplified.

Figure 2:
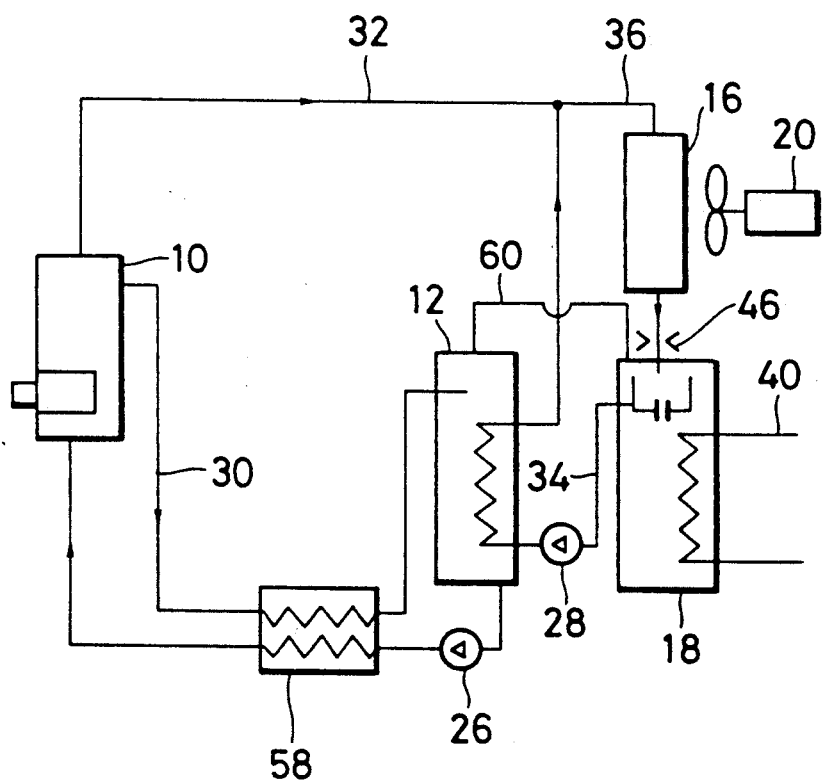
FIG. 2 is a view showing the construction of a cooler which uses a LiBr solution according to another embodiment of the present invention.

Furthermore, as shown in FIG. 2, a cooler which performs direct cooling by outside air by using a LiBr solution can be obtained as an application example of the above embodiment.

In this embodiment, a heat exchanger 58 is inserted in a pipe line of the pipe 30, the absorber 12 and the room coil 18 are connected through a pipe 60, and the refrigerant vapors ejected from the regenerator 10 and the absorber 12 are condensed by the outside air coil 16 as a condenser. The condensed coolant is supplied to the absorber 12 through the room coil 18 as an evaporator.

If the absorber 12 is cooled by air cooling, it is necessary to use many heat transfer surfaces with respect to air and to make the absorber 12 larger and it is difficult to equally distribute the concentrated solution to the whole absorber 12. However, according to this embodiment, since the absorber 12 is cooled by the condensed refrigerant, it is not necessary for the heat transfer area to be as large as a conventional air cooling absorber and can be as large as that of a water cooling absorber. On the other hand, the outside air coil should radiate the heat from the condenser and the absorber. But since the overall coefficient of heat transfer of the outside air coil 16 as a condenser is higher than that of the air cooled, the outside air coil 16 can function as a condenser without making the heat transfer area of the outside air coil 16 as large as that of the air cooled absorber, and an air cooled condenser.

In this embodiment, the components of the heat pump can be simplified the same as in the above embodiment.

Figure 3:
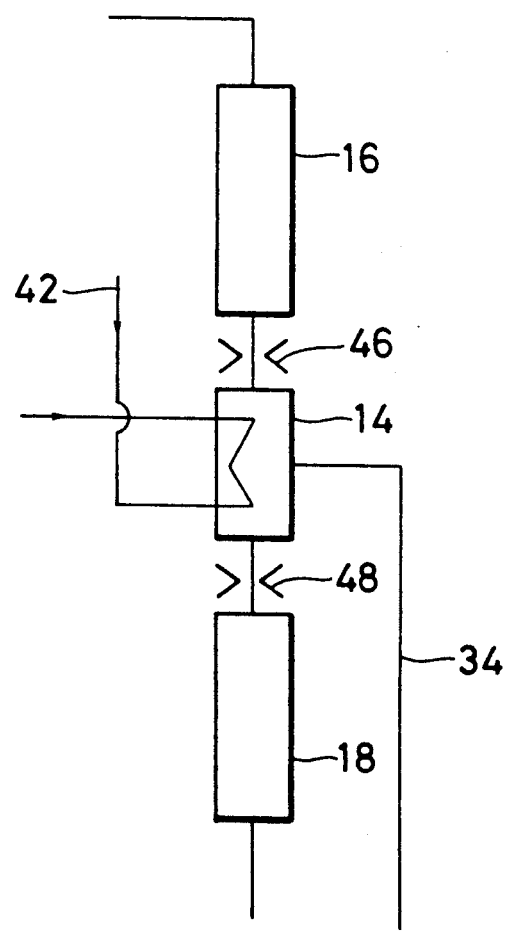
FIG. 3 is a view showing the principal construction of a variation of the embodiment shown in FIG. 1 which has no three-way valve.
Figure 4:
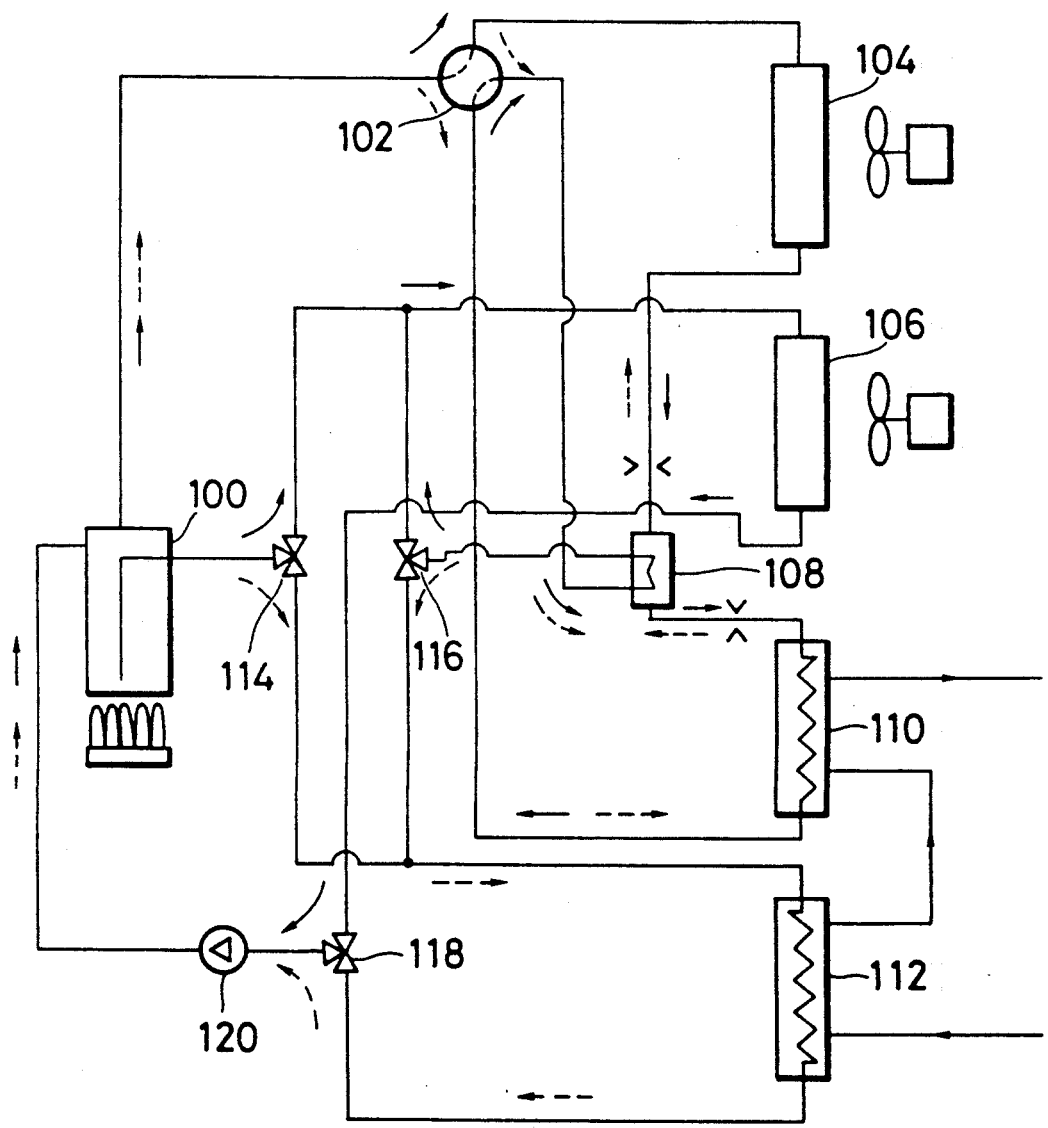
FIG. 4 is a view showing the construction of an absorption heat pump according to the above-described prior art.

Furthermore, as shown in FIG. 3, if the refrigerant is allowed to diverge from the supercooler 14 to the pipe 34 in the construction of the absorption heat pump shown in FIG. 1, the three-way valve 24 can be omitted.

As described above, according to the present invention, since the condensed refrigerant from the condenser is led into the absorber to cool the absorber and the vapor generated in the absorber is mixed with the vapor from the regenerator and supplied to the condenser, it is possible to simplify the components of the heat pump and to contribute toward making the heat pump compact.

What is claimed is:

1. An absorption heat pump for cooling and heating a space, comprising:
a regenerator inserted in a solution circulation path for heating a solution flowing through said solution circulation path and ejecting refrigerant vapor into a refrigerant path;
an absorber inserted in said solution path and in said refrigerant path for letting solution in said solution path absorb refrigerant vapor that is introduced into said solution path, whereby the absorption of the refrigerant vapor by the solution produces heat, and for changing condensed refrigerant in said refrigerant path into refrigerant vapor by said heat of absorption and ejecting the refrigerant vapor from said absorber;

an outside air coil disposed in said refrigerant path for performing heat exchange between refrigerant in said refrigerant path and outside air, said outside air coil functioning as a condenser in order to condense the refrigerant when the heat pump is in cooling mode and functioning as an evaporator in order to vaporize the refrigerant when the heat pump is in a heating mode;

a room coil disposed in said refrigerant path for performing heat exchange between refrigerant in said refrigerant path and a heating medium for a load inside a room, said room coil functioning as an evaporator in order to vaporize the refrigerant when the heat pump is in a cooling mode and functioning as a condenser in order to condense the refrigerant when the heat pump is in a heating mode;

means for mixing the refrigerant vapor ejected from said regenerator and the refrigerant vapor ejected from said absorber and supplying the mixed vapors to either said outside coil or said room coil, depending on whether said outside coil or said room coil is functioning as a condenser; and means for delivering condensed refrigerant from either said outside air coil or said room coil, depending on whether said outside air coil or said room coil is functioning as a condenser, to said absorber whereby the condensed refrigerant cools said absorber.

2. An absorption heat pump for cooling and heating a space, comprising:

a regenerator inserted in a solution circulation path for heating a solution flowing through said solution circulation path and ejecting refrigerant vapor into a refrigerant path;

an absorber inserted in said solution path and in said refrigerant path for letting solution in said solution path absorb refrigerant vapor that is introduced into said solution path, whereby the absorption of the refrigerant vapor by the solution produces heat, and for changing condensed refrigerant in said refrigerant path into refrigerant vapor by said heat of absorption and ejecting the refrigerant vapor from said absorber;

an outside air coil disposed in said refrigerant path for performing heat exchange between refrigerant in said refrigerant path and outside air, said outside air coil functioning as a condenser in order to condense the refrigerant when the heat pump is in a cooling mode and functioning as an evaporator in order to vaporize the refrigerant when the heat pump is in a heating mode;

a room coil disposed in said refrigerant path for performing heat exchange between refrigerant in said refrigerant path and a heating medium for a load inside a room, said room coil functioning as an evaporator in order to vaporize the refrigerant when the heat pump is in a cooling mode and functioning as a condenser in order to condense the refrigerant when the heat pump is in a heating mode;

a switch valve disposed in said refrigerant path, said switch valve having a first port for leading refrigerant vapor ejected from said regenerator and refrigerant vapor ejected from said absorber into said switch valve, a second port communicating with said room coil, a third port communicating with a line connected to said solution circulation path, and a fourth port communicating with said outside air coil, wherein said first port and said fourth port are in fluid connection and said second port and said third port are in fluid connection when the heat pump is in a cooling mode, and wherein said first port and said second port are in fluid connection and said third port and said fourth port are in fluid connection when the heat pump is in a heating mode; and means for delivering condensed refrigerant from either said outside air coil or said room coil, depending on whether said outside air coil or said room coil is functioning as a condenser, to said absorber whereby the condensed refrigerant cools said absorber.

3. An absorption heat pump according to claim 2, wherein said means for delivering condensed refrigerant to said absorber includes a pipeline, said pipeline being connected to a section of the refrigerant path interconnecting said outside air coil and said room coil, and a pump disposed in said pipeline.

4. An absorption heat pump according to claim 3, wherein a supercooler is disposed both in said section of the refrigerant path interconnecting said outside air coil and said room coil and in said line communicating with said third port of said switching valve and said solution circulation path, said supercooler performing heat exchange between refrigerants carried in said section of the refrigerant path interconnecting said outside air coil and said room coil and in said line communicating with said third port of said switching valve and said solution circulation path.

5. An absorption heat pump according to claim 3, wherein a three-way valve is disposed in said section of said refrigerant path interconnecting said outside air coil and said room coil.

6. An absorption heat pump for use in a refrigerator, comprising:

a regenerator inserted in a solution circulation path for heating a solution flowing through said solution circulation path and ejecting refrigerant vapor into a refrigerant path;

an absorber for letting solution in the solution circulation path absorb refrigerant vapor delivered from said refrigerant path to said solution circulation path thereby producing heat of absorption, changing a refrigerant in said refrigerant path into refrigerant vapor by said heat of absorption, and ejecting the refrigerant vapor;

an outside air coil for performing heat exchange between refrigerant in said refrigerant path and outside air, said outside air coil functioning as a condenser to condense the refrigerant;

a room coil for performing heat exchange between the refrigerant in said refrigerant path and a heating medium from a load inside a room, said room coil functioning as an evaporator to vaporize the refrigerant;

means for mixing refrigerant vapor ejected from said absorber with refrigerant vapor ejected from said regenerator and supplying the mixed refrigerant vapor to said outside air coil; and means for delivering condensed refrigerant from said outside air coil, past said room coil, and into said absorber in order to cool said absorber.

* * * * *